(12) United States Patent
Blasberg et al.

(10) Patent No.: US 11,410,421 B2
(45) Date of Patent: Aug. 9, 2022

(54) SCANNING TEST SYSTEM FOR ASSESSING HAND CLEANLINESS IN A MEDICAL PRE-TREATMENT PROTOCOL

(71) Applicant: Fresenius Medical Care Holdings, Inc., Waltham, MA (US)

(72) Inventors: Stacy L. Blasberg, Needham, MA (US); Elijah E. Cocks, Winchester, MA (US)

(73) Assignee: Fresenius Medical Care Holdings, Inc., Waltham, MA (US)

( * ) Notice: Subject to any disclaimer, the term of this patent is extended or adjusted under 35 U.S.C. 154(b) by 73 days.

(21) Appl. No.: 17/038,677

(22) Filed: Sep. 30, 2020

(65) Prior Publication Data

US 2022/0101001 A1 Mar. 31, 2022

(51) Int. Cl.
*G06K 9/62* (2022.01)
*G06V 20/20* (2022.01)
*G08B 21/24* (2006.01)
*G06T 7/00* (2017.01)

(52) U.S. Cl.
CPC ........... *G06V 20/20* (2022.01); *G06K 9/6201* (2013.01); *G06T 7/0014* (2013.01); *G08B 21/245* (2013.01); *G06T 2207/30004* (2013.01)

(58) Field of Classification Search
CPC .... G06V 20/20; G06K 9/6201; G06T 7/0014; G06T 2207/30004; G08B 21/245
See application file for complete search history.

(56) References Cited

U.S. PATENT DOCUMENTS

| | | | |
|---|---|---|---|
| 4,620,845 | A | 11/1986 | Popovich et al. |
| 5,260,598 | A | 11/1993 | Brass et al. |
| 6,038,331 | A | 3/2000 | Johnson |
| 8,157,761 | B2 | 4/2012 | Sobue et al. |
| 8,197,087 | B2 | 6/2012 | Sobue et al. |

(Continued)

FOREIGN PATENT DOCUMENTS

| | | | | |
|---|---|---|---|---|
| KR | 10-2012-0076760 A | | 7/2012 | |
| WO | WO-2005093681 A1 | * | 10/2005 | ............... C11D 3/40 |
| WO | WO-2017094016 A1 | * | 6/2017 | ............. G06F 1/163 |

OTHER PUBLICATIONS

International Search Report and Written Opinion in International Appln. No. PCT/US2021/071636, dated Jan. 19, 2022, 13 pages.

*Primary Examiner* — Matthew C Bella
*Assistant Examiner* — Kathleen M Broughton
(74) *Attorney, Agent, or Firm* — Fish & Richardson P.C.

(57) ABSTRACT

A light, such as an ultraviolet (UV) light, is used with a scanning test device in a scanning process of one or more of a user's hands to assess hand cleanliness according to a medical pre-treatment protocol for a medical treatment device, such as for a dialysis treatment using a home dialysis machine. If the scanning process results in a determination that the hands do not pass a cleanliness standard, the user is requested to perform a cleaning protocol and re-perform a scanning test. The scanning test device may be a smartphone, tablet device and/or other smart device running a software app that obtains and scans an image of the user's hand(s) illuminated by the UV light and makes an assessment of hand cleanliness according to an assessment algorithm. After passing the scanning test, the scanning test device signals to the treatment machine that the medical pre-treatment protocol may continue.

14 Claims, 9 Drawing Sheets

(56) References Cited

U.S. PATENT DOCUMENTS

| | | |
|---|---|---|
| 8,469,545 B2 | 6/2013 | Sobue et al. |
| 8,911,109 B2 | 12/2014 | Sobue et al. |
| 9,186,449 B2 | 11/2015 | Singh et al. |
| 9,687,646 B2 | 6/2017 | Sobue et al. |
| 2013/0017122 A1 | 1/2013 | Jung et al. |
| 2015/0228182 A1 | 8/2015 | Bolling |
| 2016/0203699 A1* | 7/2016 | Mulhern ................ G06V 20/52 340/573.1 |
| 2017/0172695 A1 | 6/2017 | Daniel |
| 2019/0172336 A1* | 6/2019 | Haidegger ................ A61L 2/26 |
| 2019/0331701 A1* | 10/2019 | Polley ................ G01N 35/0099 |
| 2019/0374668 A1 | 12/2019 | Kopperschmidt et al. |
| 2020/0126395 A1 | 4/2020 | Antolic-Soban et al. |

\* cited by examiner

SCANNING TEST SYSTEM FOR ASSESSING HAND CLEANLINESS IN A MEDICAL PRE-TREATMENT PROTOCOL

TECHNICAL FIELD

This application relates generally to systems and methods for medical pre-treatment protocols, particularly in connection with home medical devices and treatments.

BACKGROUND

Medical devices, such as dialysis machines, are known for use in the treatment of renal disease. The two principal dialysis methods are hemodialysis (HD) and peritoneal dialysis (PD). During hemodialysis, the patient's blood is passed through a dialyzer of a hemodialysis machine while also passing dialysate through the dialyzer. A semi-permeable membrane in the dialyzer separates the blood from the dialysate within the dialyzer and allows diffusion and osmosis exchanges to take place between the dialysate and the blood stream. During peritoneal dialysis, the patient's peritoneal cavity is periodically infused with dialysate, or dialysis solution. The membranous lining of the patient's peritoneum acts as a natural semi-permeable membrane that allows diffusion and osmosis exchanges to take place between the solution and the blood stream. Automated peritoneal dialysis machines, also called PD cyclers, are designed to control the entire peritoneal dialysis process so that it can be performed at home, usually overnight, without clinical staff in attendance. Both HD and PD machines may include displays with touch screens or other user interfaces that display information of a dialysis treatment and/or enable an operator or patient to interact with the machine.

Dialysis machines may have a disposable set which has several connectors and tubing, also referred to herein as lines, used in connection with the dialysis treatment and through which medical fluid flows during the dialysis treatment. Home dialysis patients are required to make multiple tubing connections in the process or setting up their home dialysis machine and treatment. Connectors should not be exposed to dirty surfaces and become contaminated. For example, one of the most common medical risks faced by PD patients is infection in the form of peritonitis. Peritonitis typically occurs due to a "failure" of aseptic technique when a surface of a tubing connector handled by the patient comes in contact with a non-sterile surface, such as a patient's hands, if not properly cleaned.

Accordingly, it would be desirable to provide a system that addresses the issues noted above, including issues of inadvertent failure of aseptic technique via touch contamination of medical device disposable sets.

SUMMARY

According to the present disclosure, a scanning test system comprises a light source and a scanning test device that assesses hand cleanliness according to a scanning process. The scanning test device comprises a camera and a processor, in which the camera obtains an image of a hand illuminated by the light source, and in which the processor executes an assessment algorithm to assess whether the image of the hand meets a cleanliness standard, and generates an assessment result. The scanning test device further includes an alert device that provides an alert concerning the assessment result.

In one or more implementations of the scanning test system, the light source may be an ultraviolet light source. The hand cleanliness may be assessed by the scanning test device according to a protocol of a medical device. A wireless transmitter that transmits the assessment result to a medical device, which may be a dialysis machine. The assessment algorithm may include assessing brightness of areas in the image of the hand illuminated by the light source. Additionally and/or alternatively, the assessment algorithm may include comparing the image of the hand to a stored image of a clean hand and determining cleanliness of the hand based on a comparison process between the image of the hand and the stored image of the clean hand. When the assessment result indicates that the cleanliness standard has not been met, the scanning test device may generate an alert message that is distributed using the alert device. After multiple assessment results indicating that the cleanliness standard has not been met, the scanning test device may initiate a cleanliness training and assessment protocol. The assessment result may be transmitted over a network to a remote entity.

According further to the present disclosure, a medical system comprises a medical device having a display that displays instructions of a medical pre-treatment protocol, a light source, and a scanning test device that assesses hand cleanliness according to a scanning process. The scanning test device comprises a camera and a processor, in which the camera obtains an image of a hand illuminated by the light source, and in which the processor executes an assessment algorithm to assess whether the image of the hand meets a cleanliness standard, and generates an assessment result. The scanning test device further includes an alert device that provides an alert concerning the assessment result.

In one or more implementations of the medical system, the light source may be an ultraviolet light source. The hand cleanliness may be assessed by the scanning test device according to a protocol of the medical device. A wireless transmitter that transmits the assessment result to a medical device, which may be a dialysis machine. The assessment algorithm may include assessing brightness of areas in the image of the hand illuminated by the light source. Additionally and/or alternatively, the assessment algorithm may include comparing the image of the hand to a stored image of a clean hand and determining cleanliness of the hand based on a comparison process between the image of the hand and the stored image of the clean hand. When the assessment result indicates that the cleanliness standard has not been met, the scanning test device may generate an alert message that is distributed using the alert device. After multiple assessment results indicating that the cleanliness standard has not been met, the scanning test device may initiate a cleanliness training and assessment protocol. The assessment result may be transmitted over a network to a remote entity.

BRIEF DESCRIPTION OF THE DRAWINGS

Implementations and features of the system described herein are explained with reference to the several figures of the drawings, which are briefly described as follows.

DETAILED DESCRIPTION

According to the system described herein, a light source and scanning device are used to scan a patient or care giver's hands to determine whether they are clean enough according to a cleanliness standard assessed during a medical pre-treatment protocol, such as in connection with a dialysis treatment using a home dialysis machine. In an implementation, the light is ultraviolet (UV) light from a UV light source. If an analysis of the scan indicates that the hands do not pass a cleanliness standard, the user (e.g. the patient or care giver) is requested to perform the protocol for washing and cleaning hands appropriately, and is requested to resubmit to the scan. If too many errors occur for a user, additional online training is provided, or an appointment is made with a nurse for additional training (virtual, onsite, or offsite). For example, an onsite nurse's visit may help to identify that a patient/care giver does not have enough (or the correct) soap/disinfecting supplies at the home, or the patient's eyesight is failing them at the cleaning protocol step etc. If the patient or caregiver's hands pass the scanning test by meeting the threshold of cleanliness, a signal transmitted to the dialysis machine can allow the treatment to proceed. The system described herein is principally described in connection with the user's or patient's hand(s); however, it is noted that one of ordinary skill in the art would understand that the system and techniques described herein may be applied to assess cleanliness of parts and components other than a user's hand in connection with appropriate medical pre-treatment protocols and assessments. Further, the system is described herein principally in connection with a peritoneal dialysis machine and treatment; however, it is appreciated that the system and techniques described herein may be applied to other types of medical devices and treatments, including home hemodialysis machines and treatments.

Figure 1:
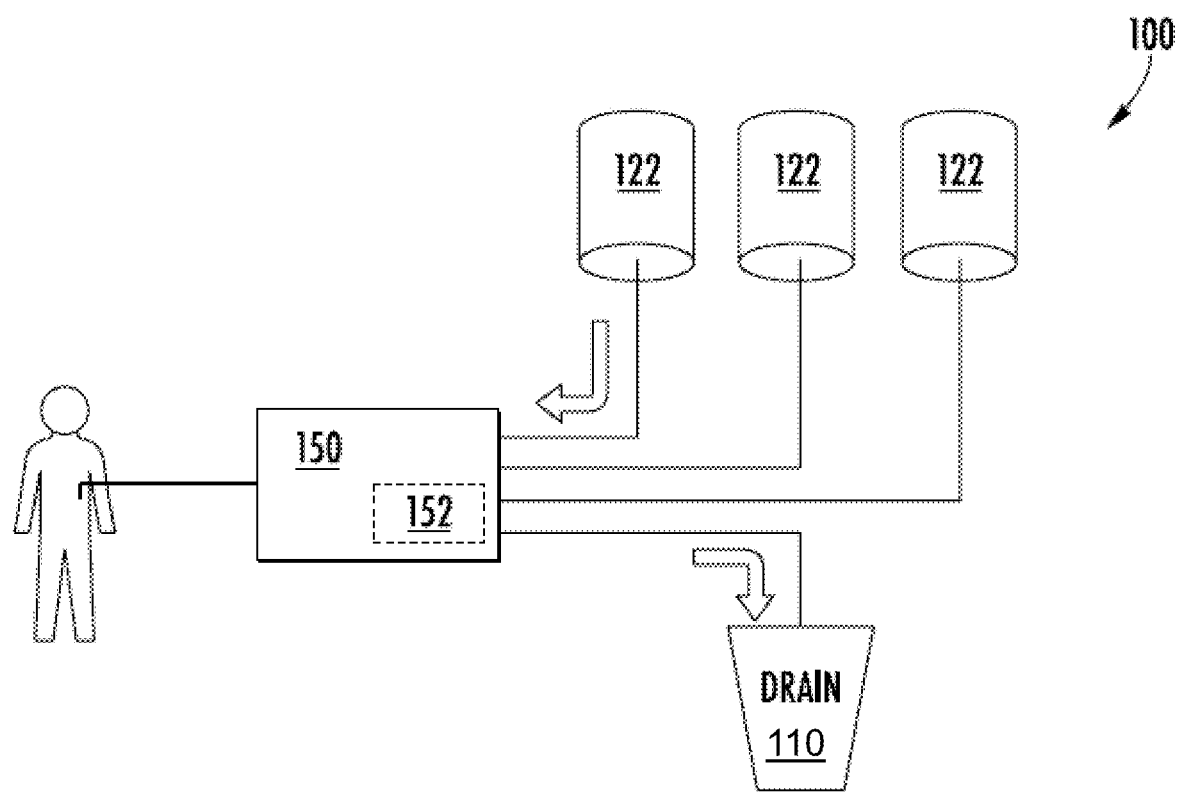
FIG. 1 is a schematic illustration showing a dialysis system with which the scanning test system described herein may be utilized according to an implementation of the present disclosure.

FIG. 1 is a schematic illustration showing a dialysis system 100 with which the scanning test system described herein may be utilized according to an implementation of the present disclosure. The system 100 includes a dialysis machine 150 illustrated as a PD machine for flowing fresh dialysate into a patient and draining used dialysate out of the patient. During treatment, a volume of dialysate may enter the patient's abdomen and remain for a period of time, e.g., a dwell time. During the dwell time, the dialysate may flow across the peritoneum and absorb contaminants and/or particulates from a patient's blood and exchange substances and fluids (e.g., electrolytes, urea, glucose, albumin, osmotically active particles, and other small molecules). At the end of the dwell time, the used dialysate may be flowed out of the patient's abdomen and purged to a drain 110 connected to the tubing, e.g., the drain line. This exchange of fresh dialysate and used dialysate after a dwell time may occur for several cycles depending on the patient's treatment regimen.

One or more dialysate sources may be connected to the dialysis machine 150. In some implementations, as illustrated, the dialysate source(s) may be dialysate bags 122 that are disposed near the dialysis machine 150. In an implementation the dialysate bags 122 may be hung which may improve air content management as any air content is disposed by gravity to a top portion of the dialysate bag 122. Additionally and/or alternatively, the dialysate bags 122 may be disposed on shelves below or near the dialysis machine 150. Valves may be attached to a bottom portion of the dialysate bags 122 so fluid is drawn out and air content delivery is minimized. In an implementation, as shown, dialysate from the dialysate bags 122 may be transferred to the patient through a heating chamber 152 formed in the dialysis machine 150 in connection with heating dialysate, such as, for example, in connection with a warming bag insertable into the dialysis machine 150. When the dialysate has reached a predetermined temperature (e.g., approximately 98°-100° F., 37° C.) in the heating chamber 152, the dialysate may be flowed into the patient. It is noted that other types and configurations of medical devices, including others types and configuration of dialysis machines may be used in connection with the system described herein.

The dialysate bags 122 may be connected to a cassette, which may be insertable into the dialysis machine 150. In use, the cassette may be connected to dialysate bag lines, which may be used to pass dialysate from dialysate bags 122 to the cassette. In use, the cassette may be disposable. Alternatively, the cassette may be reusable. In addition, a patient line and a drain line may be connected or associated with the cassette. The patient line may be connected to a patient's abdomen via a catheter and may be used to pass dialysate back and forth between the cassette and the patient's peritoneal cavity during use. The drain line may be connected to the drain or drain receptacle 110 and may be used to pass dialysate from the cassette to the drain or drain 110 receptacle during use. Although the system described herein is discussed principally in connection with the use of dialysate bags as the dialysate source, it is noted that, in other implementations, different dialysate sources may be used.

Figure 2:
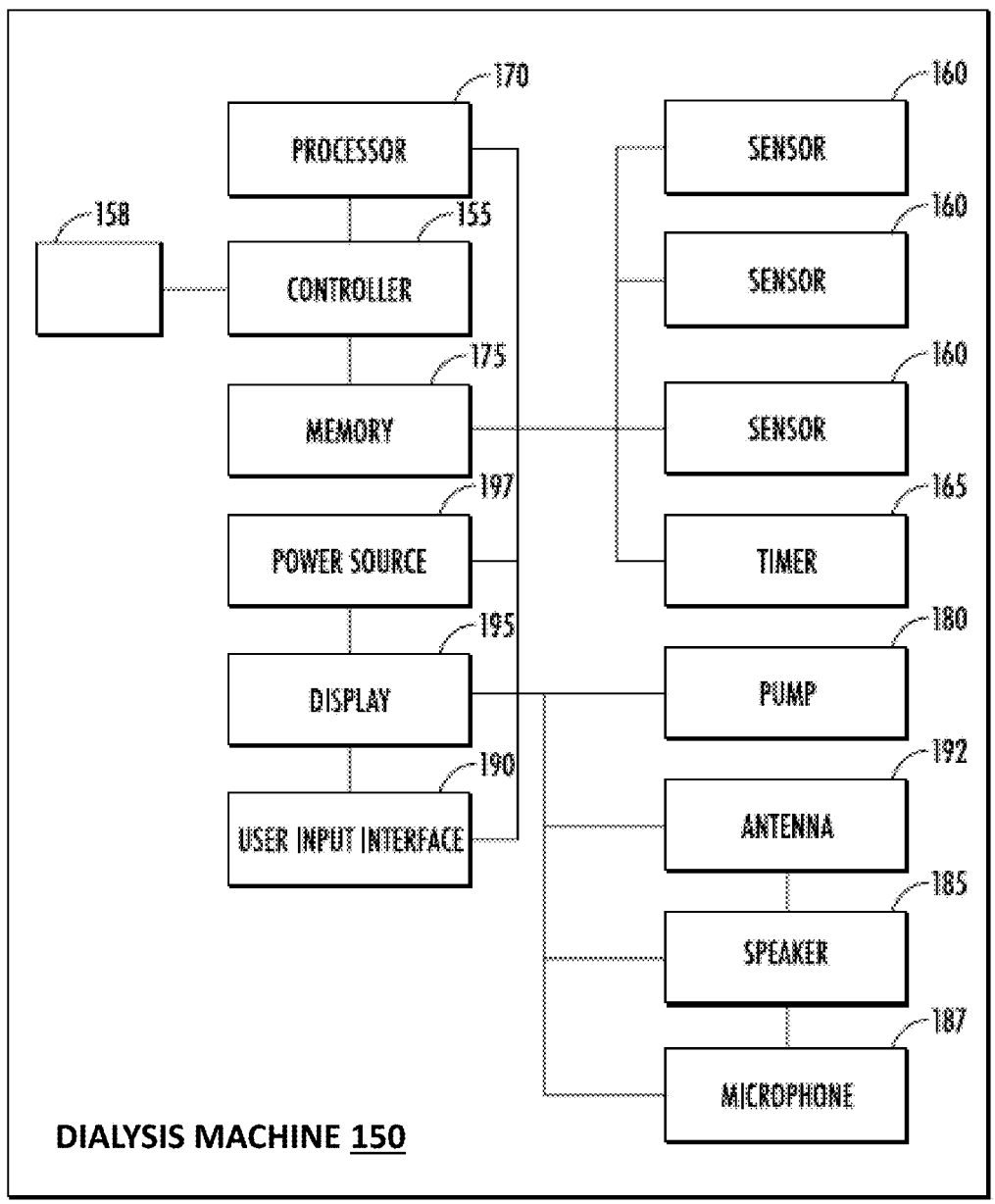
FIG. 2 is a schematic illustration of an example components of the dialysis machine in accordance with an implementation of the present disclosure.

FIG. 2 is a schematic illustration of an example components of the dialysis machine 150 in accordance with the present disclosure. A controller 155 may automatically control execution of a treatment function during a course of dialysis treatment. The controller 155 may be operatively connected to the sensors 160 and deliver a signal to execute a treatment function (e.g., transferring dialysate from the dialysate bag 122 through the heating chamber 152 and then to the patient), or a course of treatment associated with various treatment systems. In some implementations, a timer 165 may be included for timing triggering of the sensors 160.

In some implementations, the machine 150 may also include a processor 170, and memory 175, the controller 155, the processor 170, and/or the memory 175, or combinations thereof of the machine 150, may receive signals from the sensor(s) 160 indicating various parameters. Each fluid bag (e.g., the dialysate bags 122) may contain an approximate amount of dialysate, such that "approximate amount" may be defined as a 3 L fluid bag containing 3000 to 3150 mL, a 5 L fluid bag containing 5000 to 5250 mL, and a 6 L fluid bag containing 6000 to 6300 mL. The controller 155 may also detect connection of all fluid bags 122 connected.

Communication between the controller 155 and the treatment system may be bi-directional, whereby the treatment system acknowledges control signals, and/or may provide state information associated with the treatment system and/or requested operations. For example, system state information may include a state associated with specific operations to be executed by the treatment system (e.g., trigger pump to deliver dialysate, trigger pumps and/or compressors to deliver filtered blood, and the like) and a status associated with specific operations (e.g., ready to execute, executing, completed, successfully completed, queued for execution, waiting for control signal, and the like).

In some implementations, the dialysis machine 150 may include at least one pump 180 operatively connected to the controller 155. During a treatment operation, the controller 155 may control the pump 180 for pumping fluid, e.g., fresh and spent dialysate, to and from a patient. For example, the pump 180 may transfer dialysate from the dialysate bag 122 through, for example, a cassette insertable into a port formed in the dialysis machine, to the heating to chamber 152 prior to transferring the dialysis to the patient. In an implementation, the pump 180 may be a peristaltic pump. The controller 155 may also be operatively connected to a speaker 185 and a microphone 187 disposed in the machine 150. A user input interface 190 may include a combination of hardware and software components that allow the controller 155 to communicate with an external entity, such as a patient or other user. These components may be configured to receive information from actions such as physical movement or gestures and verbal intonation. In some implementations, the components of the user input interface 190 may provide information to external entities. Examples of the components that may be employed within the user input interface 190 include keypads, buttons, microphones, touch screens, gesture recognition devices, display screens, and speakers. The machine 150 may also be wirelessly connectable via an antenna 192 for remote communication. The machine 150 may also include a display 195 and a power source 197.

The sensors 160 may be included for monitoring parameters and may be operatively connected to at least the controller 155, the processor 170, and/or the memory 175, or combinations thereof. The processor 170 may be configured to execute an operating system, which may provide platform services to application software, e.g., for operating the dialysis machine 150. These platform services may include inter-process and network communication, file system management and standard database manipulation. One or more of many operating systems may be used, and examples are not limited to any particular operating system or operating system characteristic.

The memory 175 may include a computer readable and writeable nonvolatile data storage medium configured to store non-transitory instructions and data. In addition, the memory 175 may include a processor memory that stores data during operation of the processor 170. In some examples, the processor memory includes a relatively high performance, volatile, random access memory such as dynamic random-access memory (DRAM), static memory (SRAM), or synchronous DRAM. However, the processor memory may include any device for storing data, such as a non-volatile memory, with sufficient throughput and storage capacity to support the functions described herein. Further, examples are not limited to a particular memory, memory system, or data storage system.

The instructions stored on the memory 175 may include executable programs or other code that may be executed by the processor 170. The instructions may be persistently stored as encoded signals, and the instructions may cause the processor 170 to perform the functions described herein. The memory 175 may include information that is recorded, on or in, the medium, and this information may be processed by the processor 170 during execution of instructions. The memory 175 may also include, for example, specification of data records for user timing requirements, timing for treatment and/or operations, historic sensor information, and the like. The medium may, for example, be optical disk, magnetic disk or flash memory, among others, and may be permanently affixed to, or removable from, the controller 155.

The sensor(s) 160 may include a pressure sensor for monitoring fluid pressure of the machine 150, although the sensors 160 may also include any of a heart rate sensor, a respiration sensor, a temperature sensor, a weight sensor, an air sensor, a video sensor, a thermal imaging sensor, an electroencephalogram sensor, a motion sensor, an audio sensor, an accelerometer, a capacitance sensor, or any other suitable sensor. It is appreciated that the sensors 160 may include sensors with varying sampling rates, including wireless sensors.

The controller 155 may be disposed in the machine 150 or may be coupled to the machine 150 via a communication port or wireless communication links, shown schematically as communication element 158. According to various examples, the communication element 158 may support a variety of one or more standards and protocols, examples of which include USB, Wi-Fi, TCP/IP, Ethernet, Bluetooth, and/or HTTPS, among others. As a component disposed within the machine 150, the controller 155 may be operatively connected to any of the sensors 160, the pump 180, and the like. The controller 155 may communicate control signals or triggering voltages to the components of the machine 150. As discussed, exemplary implementations of the controller 155 may include wireless communication interfaces. The controller 155 may detect remote devices to determine if any remote sensors are available to augment any sensor data being used to evaluate the patient.

Figure 3:
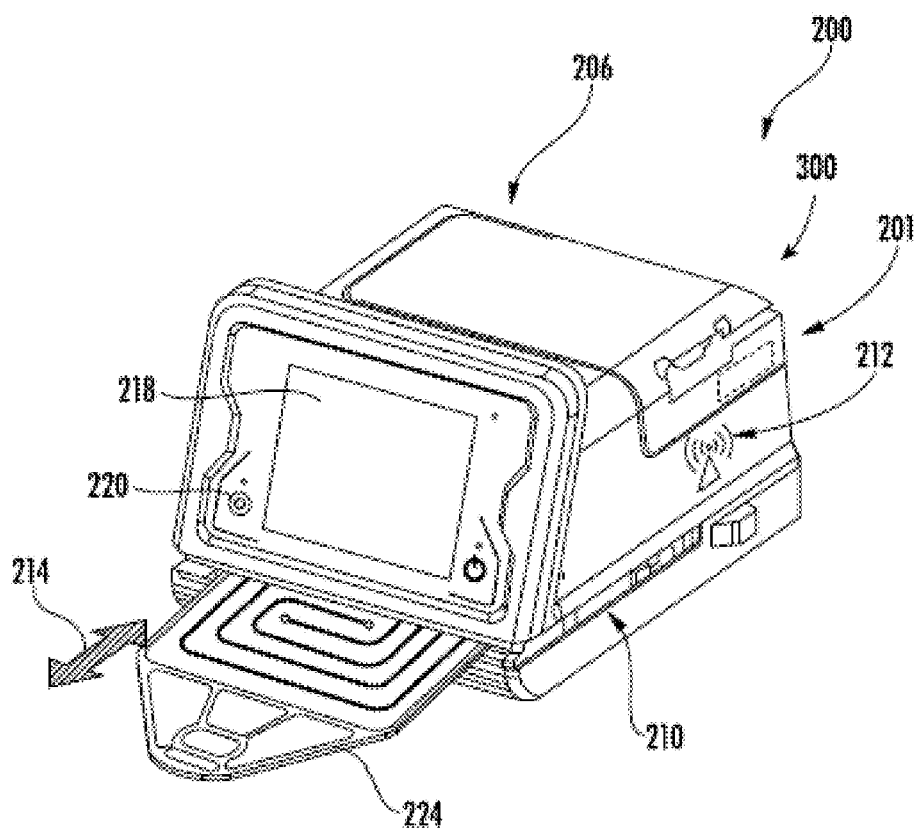
FIG. 3 illustrates an example of a dialysis machine, specifically a peritoneal dialysis machine, that can be used according to an implementation of the present disclosure.

FIG. 3 illustrates an example of a dialysis machine 200, that may be an implementation, for example, of the dialysis machine 150, that can be used according to the system described herein. The dialysis machine 200 may be implemented in the dialysis system 100 and may include, for example, a housing 206, a processing module 201, a connection component 212, a touch screen 218, and a control panel 220 operable by a user (e.g., a caregiver or a patient) to allow, for example, set up, initiation, and/or termination of a dialysis treatment.

The touch screen 218 and the control panel 220 may allow a user to input various treatment parameters to the dialysis machine 200 and to otherwise control the dialysis machine 200. In addition, the touch screen 218 may serve as a display. The touch screen 218 may function to provide information to the patient and the operator of the dialysis system 100. For example, the touch screen 218 may display information related to a dialysis treatment to be applied to the patient, including information related to a prescription.

The dialysis machine 200 may include a processing module 201 that resides inside the dialysis machine 200, the processing module 201 being configured to communicate with the touch screen 218 and the control panel 220. The processing module 201 may be configured to receive data from the touch screen 218, the control panel 220, and sensors, e.g., air, temperature and pressure sensors, and control the dialysis machine 200 based on the received data. For example, the processing module 201 may adjust the operating parameters of the dialysis machine 200.

The dialysis machine 200 may be configured to connect to a network. The connection to network may be via a wired and/or wireless connection. The dialysis machine 200 may include a connection component 212 configured to facilitate the connection to the network. The connection component 212 may be a transceiver for wireless connections and/or other signal processor for processing signals transmitted and received over a wired connection. Other medical devices (e.g., other dialysis machines) or components may be configured to connect to the network and communicate with the dialysis machine 200.

The dialysis machine 200 may also include one or more heating elements disposed internal to the machine 200 and an opening or cavity 210 (used interchangeably herein without the intent to limit) arranged and configured to receive a warming bag 224 in a direction indicated at arrow 214. In use, the warming bag 224 may be inserted into the opening 210 formed in the PD machine 200 and into the heating chamber 152 positioned within the dialysis machine 200. In some implementations, the warming bag 224 may be configured so dialysate may continually flow through the warming bag 224 to achieve a predetermined temperature before flowing into the patient. For example, in some implementations the dialysate may continually flow through the warming bag 224 at a rate of approximately 200 mL/min. Thus arranged, the pump 180 may pump dialysate from the dialysate bag 122 through, for example, a cassette positioned in a cassette port 300, through the warming bag 224 positioned in the heating chamber 152, and eventually to the patient.

Figure 4:
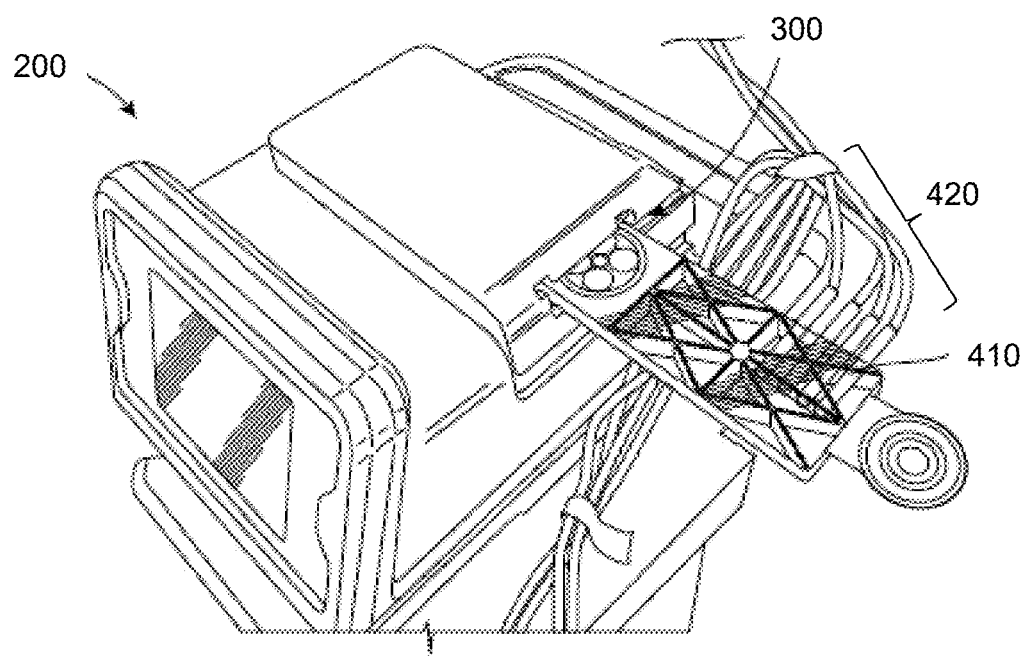
FIG. 4 is a schematic illustration of the dialysis machine including a cassette, which may be insertable by a patient or caregiver into the cassette port of the dialysis machine in connection with a dialysis treatment.

FIG. 4 is a schematic illustration of the dialysis machine 200 including a cassette 410, which may be insertable by a patient or caregiver into the cassette port 300 of the dialysis machine 200 in connection with a dialysis treatment. In use, the cassette 410 may be connected to tubing and lines 420, e.g. connected by a patient or caregiver, and may be used to pass dialysate from dialysate bags 122 to the cassette 410. In use, the cassette 410 may be disposable. Alternatively, the cassette 410 may be reusable. Thus arranged, with the cassette 410 positioned in the cassette port 300, and the tubing 420 connected, the at least one pump 180 positioned within the dialysis machine 200 may be operated to pump fluid, e.g., fresh and spent dialysate, to and from the patient.

The need and demand for home dialysis, whether it be PD or HD, is growing globally. There are many benefits to home dialysis including, but not limited to, flexibility to conduct the treatment outside of regular clinic hours or times of day to allow for the patient to maintain a career or regular working hours, be a present parent or caregiver for a loved one, or simply have the flexibility to travel or participate in activities on one's own schedule. However, one of the major risks to a patient providing their own dialysis treatments at home is the potential for infection at the patient connection sites caused by touch contamination. For example, PD dialysis has been shown to be advantageous to many patients, however PD patients often suffer from infections like peritonitis that may scar the peritoneum and bring an end to their capability for PD treatment.

Figure 5A:
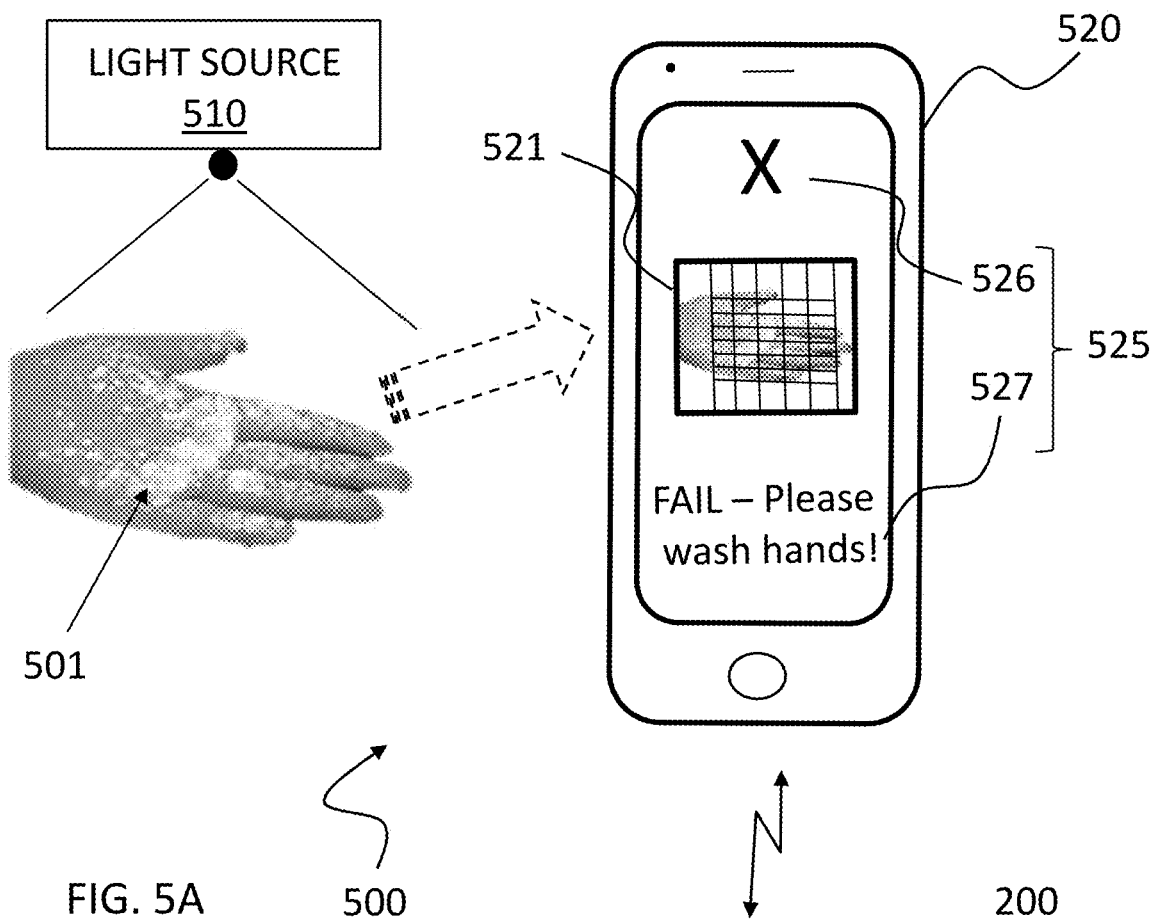
FIGS. 5A and 5B are schematic illustrations showing examples of a scanning test system implementing a hand cleanliness assessment pre-treatment protocol according to the present disclosure.
Figure 5A:
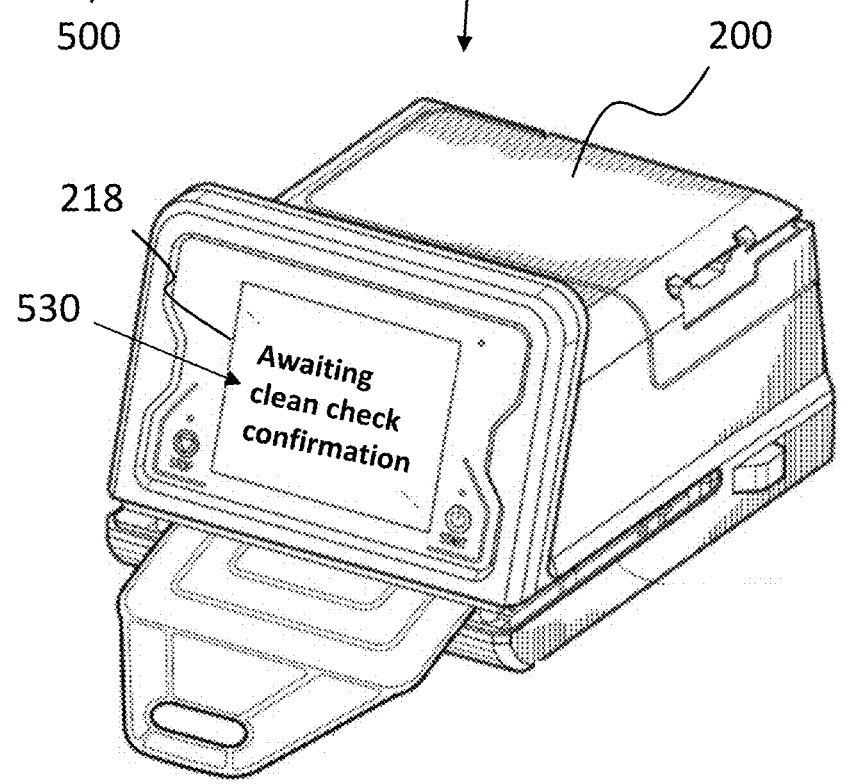
Figure 5B:
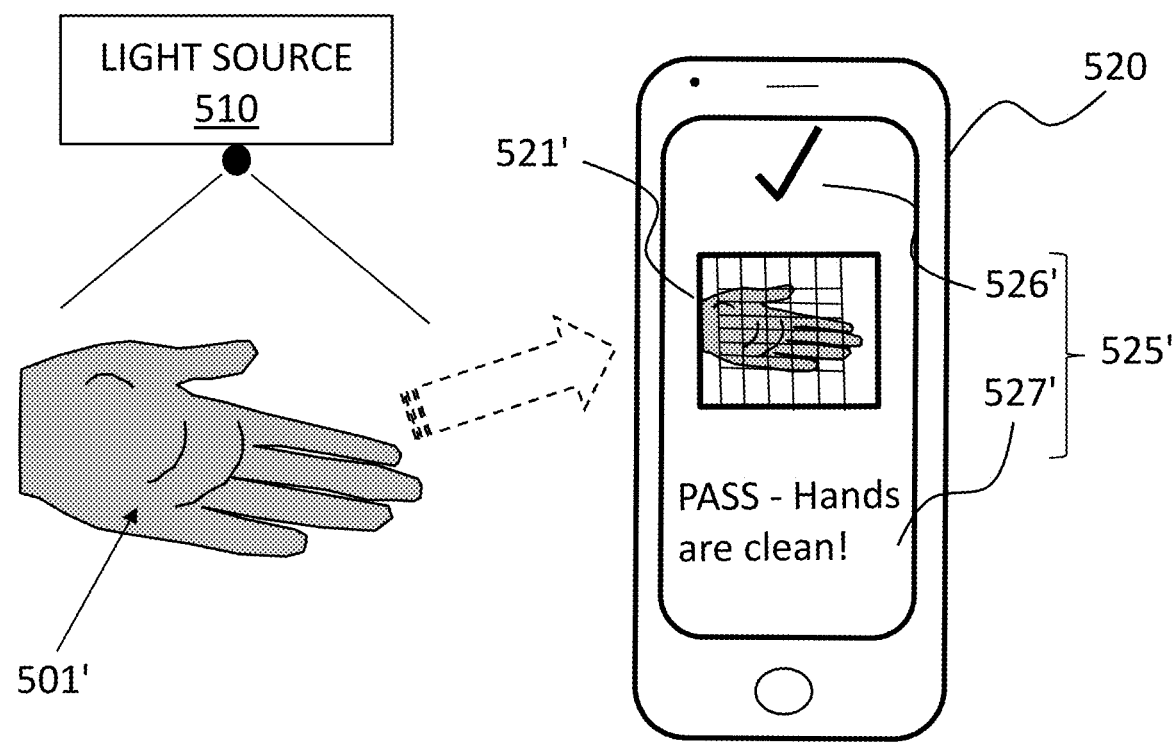
Figure 5B:
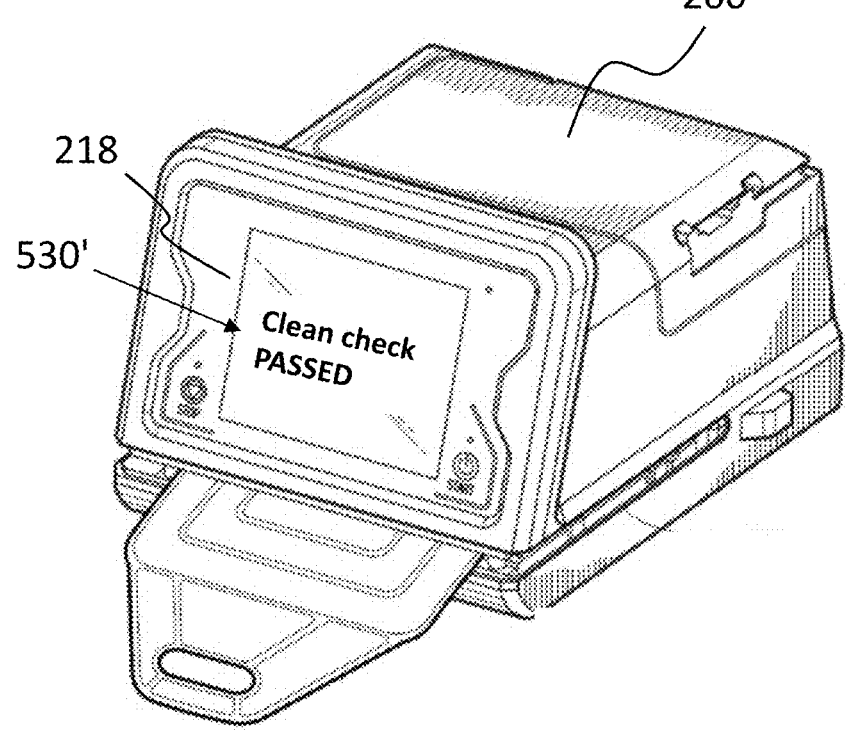

FIGS. 5A and 5B are schematic illustrations showing examples of a scanning test system 500 implementing a hand cleanliness assessment pre-treatment protocol according to the present disclosure. As shown in FIG. 5A, a pre-treatment protocol may be run on a screen of a medical device, such as the screen 218 of the PD machine 200, in which the patient or care giver is walked through a cleaning protocol. As part of that protocol, a hand cleanliness check may be required and the scanning test system 500 may initiate a scan of the patient's hands using a light from a light source 510 and a scanning test device 520. The scanning test device 520, such as a smartphone, tablet and/or other "smart" or mobile computing device having loaded thereon a scanning app/software, may be used to look for and illuminate germs and contaminants on a user's/patient's hand 501. In an implementation, the light may be ultraviolet light from an ultraviolet light (UV) source, although other suitable light spectrum frequencies may be used in connection with the system described herein that would induce a visual or measured change of a surface when illuminating the surface based on the presence of germs or contaminants on the surface, In some implementations, the user or patient may pre-treat their hands with a liquid or other substance that clings to germs and contaminants and is absorptive of the light, e.g., the ultraviolet light, so as to be distinctively illuminated to show areas of the hands that have germs or contaminants (i.e. areas that are not clean). However, in other implementations, no hand pre-treatment is performed and the UV or other light only is used to illuminate one or more hands and any contaminants thereon in connection with the scanning test processing according to the system described herein. The scanning processing may include the scanning test device 520 taking a picture or image 521 of the user's hand 501 while illuminated by the light source 510 using a camera of the scanning test device 520.

The light source 510 may be a stand-alone component of the scanning test system 500 to provide the desired light, such as UV light. In another implementation, the light source 510 may be incorporated into the scanning test device 520. For example, the light source may be a light source of the scanning test device 520, and including light emitted from a smartphone, such as a flash unit of the smartphone, coupled with a suitable configuration, attachment and/or filter to provide for emission of UV light from the smartphone.

In one or more implementations, the image 521 taken by the camera may be a still image, like a photograph, and/or may be a live, real-time streamed image of the user's hand 501. The image 521 is displayed on a screen of the scanning test device 520, which may be a smartphone, tablet device and/or other smart device with a display according to one or more implementations. In an implementation, the scan may be performed using software (e.g. an "app") on the scanning test device 520, that is executed by one or more processors of the scanning test device 520, that is configured to assess hand cleanliness. In an implementation, the scanning test device 520 may assess brightness of scanned areas on the hand in the image 521, for example, according to one or more assessment algorithms. In an implementation, the processing may include an image processing algorithm that determines levels (e.g. number and/or intensity) of pixel brightness of the image and assesses those determined values to a threshold value with respect to the image being displayed. Suitable image processing techniques, e.g. based on pixel brightness and/or color and including contrast between a subject pixel and surrounding pixels, may be used in connection with this assessment as would be understood by one of ordinary skill in the art.

As shown in FIG. 5A, the scanning test device 520 may include an alert device 525 that may include an indication 526 (such as X mark or a check mark) of the results of the assessment and/or a message 527 with alert information and instructions, among other implementations. For example, in various implementations, the indication 526 may include a color coded indication (e.g. red for fail or green for pass) and the message 527 may be displayed text, a displayed image or video and/or an audible or verbal message or instruction from a microphone of the scanning test device 520. As shown, the results of the scanning test are that the image 521 of the user's hand 501 has received a FAIL assessment for the cleanliness standard of the assessment algorithm. The indication 526 (e.g. X mark) and the message 527 displayed on the scanning test device 520 communicates this to the user and provides further instructions, such as "Please wash hands!" In one or more implementations, the scanning test FAIL result may be wirelessly transmitted to the dialysis machine 200 and/or no signal is transmitted to the dialysis machine 200, and in either case, the status of the dialysis machine 200 is awaiting confirmation of a successful hand cleanliness scanning test before continuing with the pre-treatment protocol. In one or more implementations, after multiple failed scanning tests, an override option may be provided to allow for the dialysis treatment to continue, but with suitable logging and follow-up actions facilitated for the multiple fails of the scanning test.

As shown in FIG. 5B, which may be a separate processing iteration and/or may be, for example a follow up iteration after FIG. 5A, in this processing example of the scanning test system 500, the user's hand 501' is illuminated by UV light from the light source 510 and an image 521' is obtained of the user's hand 501'. The scanning test processing is performed by the scanning test device 520, and the results, as shown in the figure, are shown via the alert device 525' that may include an indication 526' (check mark) and a message 527', which in the illustration is a message of a successful pass of the hand cleanliness standard, i.e. "PASS—Hands are clean!" A signal conveying the scanning test PASS result is wirelessly transmitted to the dialysis machine 200, which, upon receipt of that signal, displays a message 530' indicating that that the hand cleanliness protocol has been passed ("Clean Check PASSED") and allows the medical pre-treatment protocol to continue.

Figure 6:
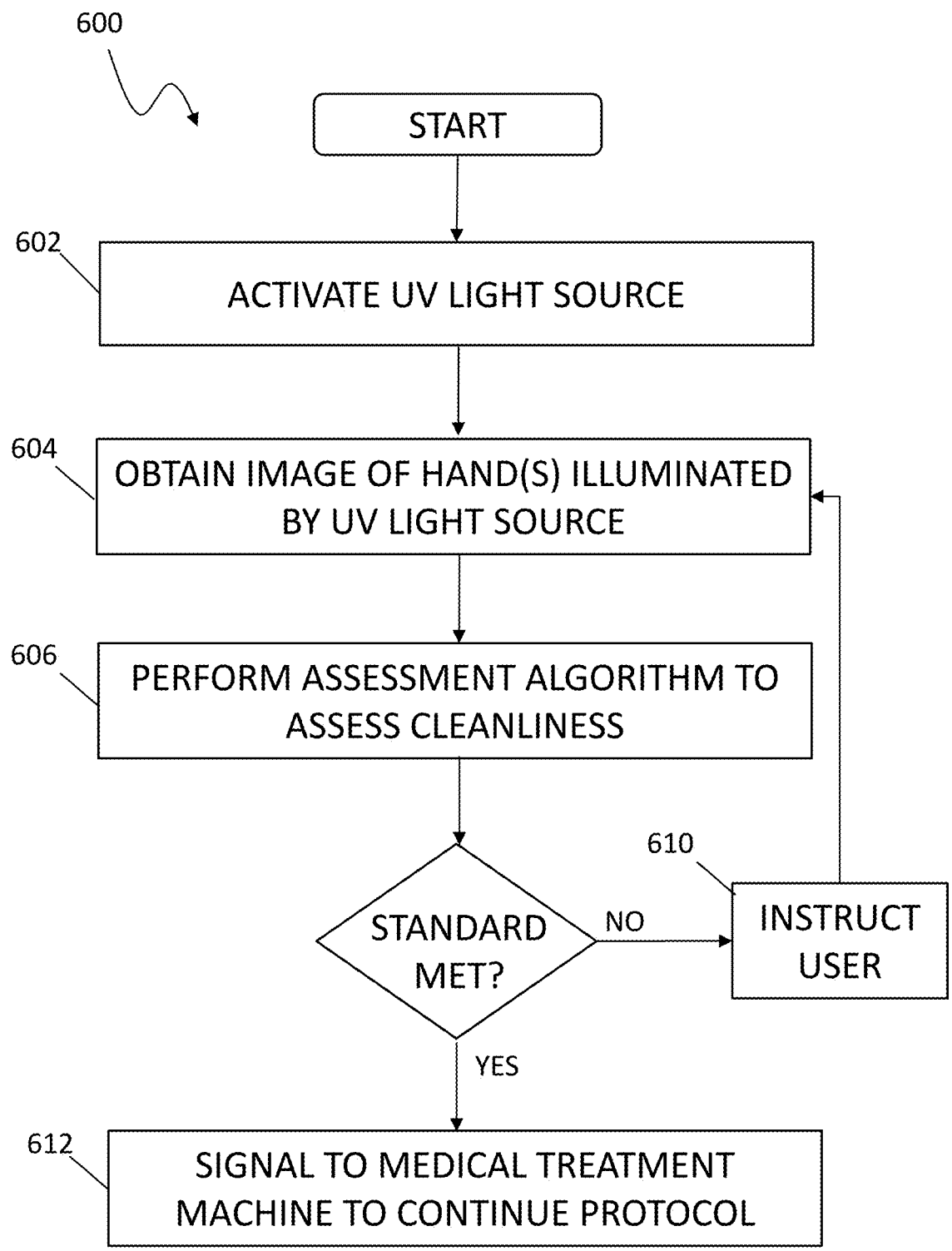
FIG. 6 is a flow diagram showing example processing for a scanning process used by a scanning test device with app according to one or more implementations of the present disclosure.

FIG. 6 is a flow diagram 600 showing example processing of a scanning process for assessing hand cleanliness according to one or more implementations of the present disclosure. At a step 602, a light source, like the light source 510, is activated to illuminate one or more of a user's hands, such as using UV light. It is noted that the light source 510 may be a stand-alone component of the scanning test system, and/or may be incorporated into the scanning test device 520. For example, the UV light source may be a light source of the scanning test device 520, and including light emitted from a smartphone, such as flash unit of the smartphone, coupled with a suitable configuration, attachment and/or filter to provide for emission of UV light from the smartphone. At a step 604, the scanning test device, e.g. using a camera and app, takes an image of the user's hand(s). At a step 606, an assessment algorithm is performed on the image. According to one or more implementations of the system described herein, the assessment algorithm may be include a determination of whether a number of bright areas on the image of the user's hand exceeds a threshold or if the total brightness of the areas exceeds a threshold, the scan processing may determine that the hand being scanned has not met a cleanliness standard. Other suitable image scanning and processing techniques may be used in connection with evaluating the results of the hand cleanliness illumination scanning test. For example, in other implementations, additionally and/or alternatively the assessment algorithm may include a comparison process of the current hand image to a previously stored "clean hand" image, as further described in detail elsewhere herein.

At a test step 608, if contaminants are detected by the scan according to the scanning test algorithm for hand cleanliness and the assessment is that the hand does not meet the cleanliness standard, the user may be instructed to follow the cleaning protocol again (step 610), and which processing would continue until the user can pass the scan test. The warning or alert message may be displayed on the screen of the scanning test device 520 and/or on the screen of the treatment machine 200, which may be in wireless contact with the scanning test device 520 over a local area network, such as Wi-Fi or Bluetooth. According to the medical pre-treatment protocol, the dialysis machine 200 may require a signal from the scanning test device 520 to indicate either that the scanning test has been performed and/or that the scanning test has been passed successfully. In some circumstances, the machine may automatically respond, for example, by providing additional training for that patient to help improve hand cleanliness procedures or it may send an alert to a clinician to visit with or call the home patient to further assess and assist. If the cleanliness standard is met at the test step 608, then processing proceeds to a step 612, where the medical treatment machine is signaled that the cleanliness check has been passed and the medical pre-treatment protocol may continue. In an implementation, in some circumstances, the medical pre-treatment protocol may allow for an override of the scanning test result at the dialysis machine 200 to allow for the dialysis treatment to proceed even where the cleanliness standard has not been met. Additionally and/or alternatively, in other implementations, information corresponding to an acknowledgment or recognition that the patient has achieved a high number of PASSES/low number of FAILS over a time period. This information may correspond to an incentive program where high number of PASSES/low number of FAILS generates benefits for the user, such as recognition awards, leader board competitions, or even financial benefits from a provider, such as credits for reduced supply costs and/or decreased insurance premiums.

In some implementations, the scanning process used by the scanning test app may include use one or more computational models to analyze hand images that have been illuminated by ultraviolet light to determine hand cleanliness. Non-limiting examples of computational models may include determining numbers of brightness spot and/or overall brightness level assessments compared to thresholds, prior baseline images or measurements and/or other image assessment computational modules. Computational models may include one or more models trained to analyze images, and hand images in particular. For example, in various implementations, computational models may be trained to analyze images to determine brightness features and/or other information on the illuminated hand image that may be used to diagnose whether a hand has contaminants on the surface thereof. For example, patient-based training may include training a computational model with hand images of a particular patient and information indicating the condition or cleanliness or other information that may be used to determine hand cleanliness level. In another example, population-based training may include training a computational model with hand cleanliness images of a particular population of patients and information indicating the condition and hand cleanliness or other information.

Figure 7:
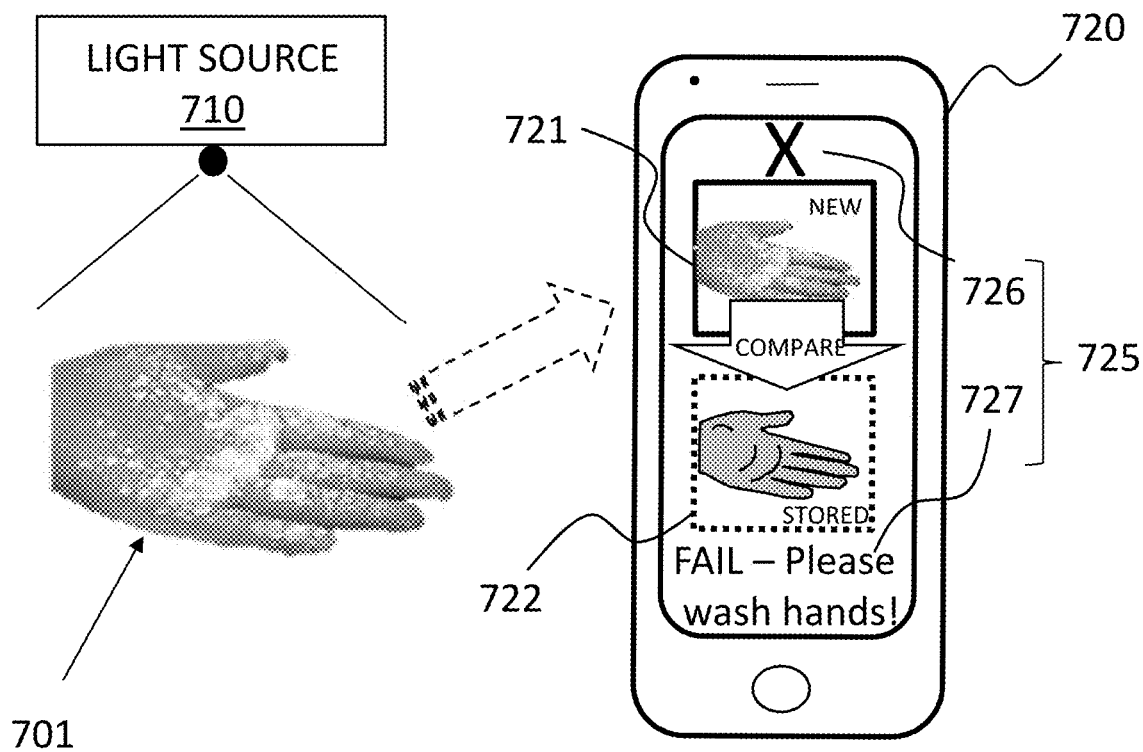
FIG. 7 is a schematic illustration showing a system processing a hand cleanliness assessment algorithm concerning use of comparison of a current hand image to a prior stored "clean hand" image that may be used for a baseline comparison to determine cleanliness according to an implementation of the system described herein.
Figure 7:
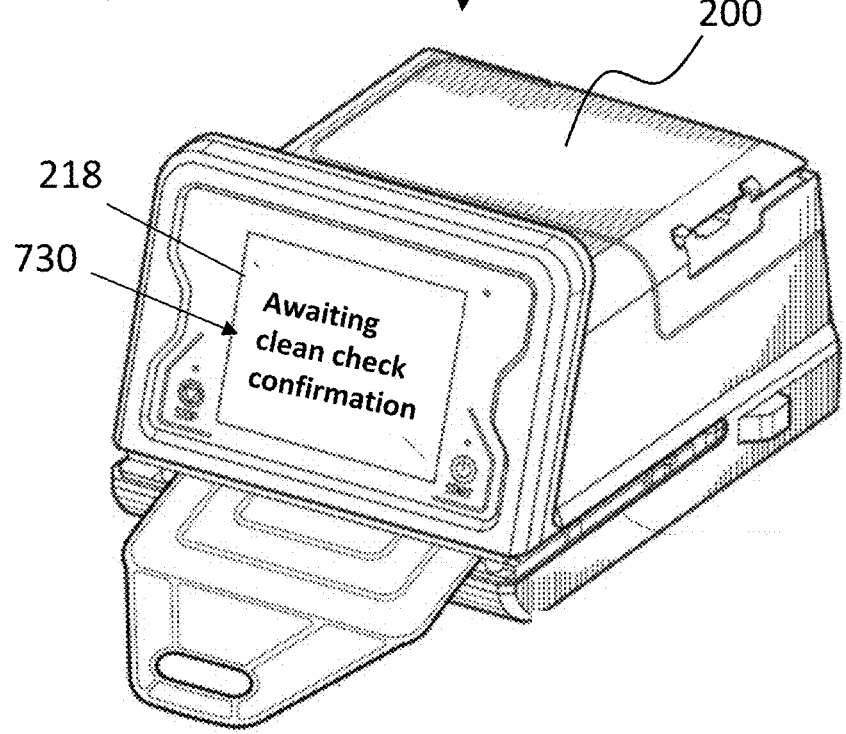

FIG. 7 is a schematic illustration showing a system 700 processing a hand cleanliness assessment algorithm concerning use of comparison of a current hand image to a prior stored "clean hand" image that may be used for a baseline comparison to determine cleanliness according to an implementation of the system described herein. As part of that protocol, the scanning test system 700 may initiate a scan of the patient's hands using a light from a light source 710 and a scanning test device 720, such as a smartphone, tablet and/or other "smart" or mobile computing device having loaded thereon a scanning app/software, may be used to look for and illuminate germs and contaminants on a user's/patient's hand 701. In an implementation, the light may be ultraviolet light from an ultraviolet light source, although other suitable light spectrum frequencies may be used in connection with the system described herein that would induce a visual or measured change of a surface when illuminating the surface based on the presence of germs or contaminants on the surface, In some implementations, the user or patient may pre-treat their hands with a liquid or other substance that clings to germs and contaminants and is absorptive of the light, e.g., the ultraviolet light, so as to be distinctively illuminated therein to show areas of the hands that have germs or contaminants (i.e. are not clean). However, in other implementations, no hand pre-treatment is performed and the ultraviolet or other light only is used to illuminate one or more hands and any contaminants thereon in connection with the scanning test processing according to the system described herein. The scanning processing may include the scanning test device 720 taking a picture or image 721 of the user's hand 701 while illuminated by the light source 710 using a camera of the scanning test device 720.

The image 721 is displayed on a screen of the scanning test device 720. In an implementation, the scan may be performed using software (e.g. an "app") on the scanning test device 720 that is configured to assess brightness of scanned areas on the hand in the image 721, for example, according to one or more assessment algorithms, as further described herein. As shown in the figure, the scanning test device 720 may include an alert device 725 that may include an indication 726 (such as X mark or a check mark) of the results of the assessment and/or a message 727 with alert information and instructions, among other implementations. For example, in various implementations, the indication 726 may include a color coded indications (e.g. red for fail or green for pass) and the message 727 may be an audible or verbal message or instruction from a microphone of the scanning test device 720.

In one or more implementations, the assessment algorithm of the image 721 may include a comparison process for comparing the current hand image 721 to a stored "clean hand" image 722 that has been previously stored on the scanning test device 720 as a baseline for assessing hand cleanliness. In an implementation, the stored image 722 may be a prior image taken of the user's hand at a time when it has been assessed the user's hand is clean. The assessment algorithm may determine which is hand is being imaged (e.g. the left hand or right hand of the user) and the corresponding previously stored image accessed for the comparison process. The assessment algorithm may be performed using the processor of the scanning test device and running software thereon that processes an algorithm to identify the user's hand, access stored images corresponding to the user's hand, and make a comparison, for example, based on identifications of brightness areas, between the current hand image taken of the user's hand and the accessed stored image. Appropriate image comparison software and techniques, as would be understood by one of ordinary skill in the art, may be utilized. For example, the earlier assessment of hand cleanliness of the user may have been performed by the user during a setup or initialization process of the scanning test device. Additionally and/or alternatively, the prior image may have been taken after an assessment by a clinician or health care provider, either in the home of the use or at a clinic, and the clean hand image transmitted to the scanning test device 720 and stored the clean hand stored image 722. As shown, the results of the scanning test are that the image 721 of the user's hand 701 has received a FAIL assessment for the cleanliness standard of the assessment algorithm. The indication 726 (e.g. X mark) and the message 727 displayed on the scanning test device 720 communicates this to the user and provides further instructions such as "Please wash hands!" In one or more implementations, the scanning test FAIL result may be wirelessly transmitted to the dialysis machine 200 and/or no signal is transmitted to the dialysis machine 200, and in either case, the status of the dialysis machine 200 is awaiting confirmation of a successful hand cleanliness scanning test.

Figure 8:
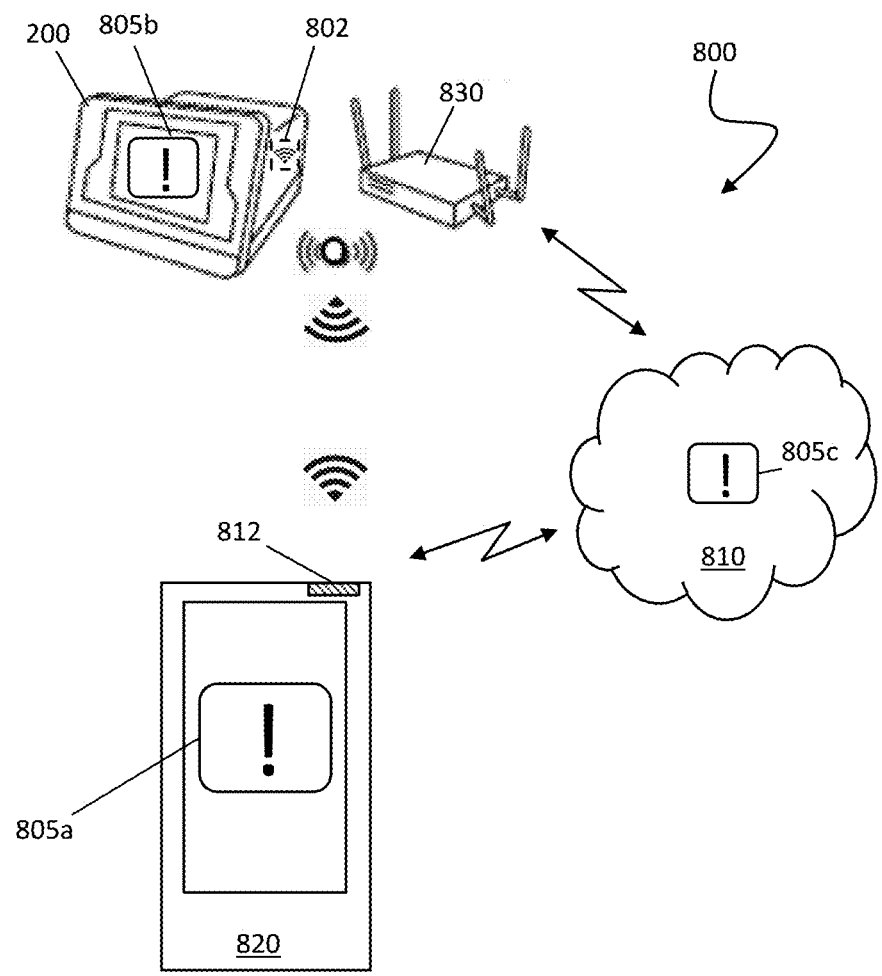
FIG. 8 is a schematic illustration showing one or more implementations of a network messaging system used for reporting information of scanning test results according to the present disclosure.

FIG. 8 is a schematic illustration showing one or more implementations of a network messaging system 800 used for transmitting information to a remote entity via a network, such as reporting information of scanning test results according to the present disclosure. A network 810 is illustrated schematically representing an intranet or external network, such as the Internet, through which messages, such as a message 805*a* that may be an alert, log and/or other message concerning results of one or more scanning tests, may be transmitted to one or more entities and/or software systems or via one or more components of a medical system including the dialysis machine 200. The message 805*a* may be transmitted using one or more components of a connected health system, such as via a gateway 830 device, to the dialysis machine 200, and including wireless transmission via a wireless transceiver 802 of the dialysis machine 200. The message is shown displayed as a message 805*b* on the dialysis machine 200 and which may be the same as the message 805*a* or a different, expanded or condensed version of the message 805*a*. In various implementations, one or more of the messages 805*a,b,c* may include photographic, audio and/or video messages, and may include dynamic or interactive elements using graphical user interface (GUI) components (e.g. touchscreen) of the displaying screen, that, for example, require the patient to select options to proceed through the interactive elements of the message.

In an implementation, also illustrated by the network messaging system 800, the network message 805*a* may be transmitted directly to the network 810 via the mobile device/scanning test system 820, e.g. via a wireless transceiver 812 of the mobile device 820, and which may transmit the message 805*a* that may be the same as the message 805*a* and/or the message 805*b* or a different, expanded or condensed version of the message 805*a* and/or the message 805*b*. In various implementations, the mobile device 820 may include a smartphone, a tablet device and/or other "smart" or mobile computing device having a display.

In another implementation, the message 805*b* displayed on the dialysis machine 200 may be transmitted from the dialysis machine 200 to the mobile device 820 either directly or via the gateway 830. Additionally, and/or alternatively, in another implementation, the gateway 830 may receive the message from the mobile device 820 and transmit the message to the dialysis machine 200 and/or to the network entity 810. In one or more implementations, the message 805a,b,c may be transmitted via a cloud-based or wide area network communication system directly to the a remote entity via the network 810 from the mobile device 830. In another implementation, the gateway 830 may receive the message 805a,b,c and thereafter transmit the message 805a, b,cc, via a local area network, such as a Wi-Fi or Bluetooth connection, to the dialysis machine 200 or via the network 810. Additionally, and/or alternatively, in another implementation, the message 805a may be transmitted via a mobile telecommunication system to the network 810. The mobile device 820 may include and run a mobile application that enables communication between the mobile device 820 and the gateway 830 and/or dialysis machine 200. The communication may be suitably encrypted/decrypted and the processing may include authorized pairing between the mobile application/the mobile device 820 and the gateway 830 and/or the dialysis machine 200.

The message 805a,b,c may include an alert to the remote entity via the network 810 that an enhanced cleanliness training and/or assessment is needed for the user/patient of the dialysis machine 200. For example, if too many errors occur for a user, the message 805a may be used to provide or schedule additional online training or an appointment with a nurse for additional training (virtual, onsite, or offsite) for the user. For example, an onsite nurse's visit may help to identify that a user/patient does not have enough (or the correct) soap/disinfecting supplies at the home, or the patient's eyesight is failing them at the cleaning protocol step etc. Alternatively, the message 805a,b,c, may include information corresponding to an acknowledgement or recognition that the patient has achieved a high number of PASSES/low number of FAILS over a time period. The message 805a,b,c may correspond to an incentive program where high number of PASSES/low number of FAILS generates benefits for the user, such as recognition awards, leader board competitions, or even financial benefits from a provider, such as credits for reduced supply costs and/or decreased insurance premiums.

Implementations discussed herein may be combined with each other in appropriate combinations in connection with the system described herein. Additionally, in some instances, the order of steps in the flow diagrams, flowcharts and/or described flow processing may be modified, where appropriate. The system may further include a display and/or other computer components for providing a suitable interface with a user and/or with other computers. Aspects of the system described herein may be implemented or controlled using software, hardware, a combination of software and hardware and/or other computer-implemented or computer-controlled modules or devices having described features and performing described functions. Data exchange and/or signal transmissions to, from and between components of the system may be performed using wired or wireless communication. This communication may include use of one or more transmitter or receiver components that securely exchange information via a network, such as the Internet, and may include use of components of local area networks (LANs) or other smaller scale networks, such as Wi-Fi, Bluetooth or other short range transmission protocols, and/or components of wide area networks (WANs) or other larger scale networks, such as mobile telecommunication networks.

Software implementations of aspects of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system. The meanings of any method steps of the invention(s) described herein are intended to include any suitable method of causing one or more parties or entities to perform the steps unless a different meaning is expressly provided or otherwise clear from the context.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c].

Implementations of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A medical system, comprising:
    a medical device having a display that displays instructions of a medical pre-treatment protocol that is performed prior to the medical device performing a medical treatment;
    a light source;
    a scanning test device that assesses hand cleanliness according to a scanning process, wherein the scanning test device is wirelessly coupled to the medical device, the scanning test device comprising:
        a camera and a processor, wherein the camera obtains an image of a hand illuminated by the light source, and wherein the processor executes an assessment algorithm to assess whether the image of the hand meets a cleanliness standard and generates an assessment result;
        an alert device that provides an alert concerning the assessment result; and
        a transmitter that wirelessly transmits the assessment result to the medical device,
    wherein, during the medical pre-treatment protocol, the medical device awaits receipt of the assessment result from the scanning test device, and wherein, if the assessment result is a successful assessment result indicating that the cleanliness standard has been met, the medical device is caused to continue with the medical pre-treatment protocol.

2. The medical system of claim 1, wherein the light source is an ultraviolet light source.

3. The medical system of claim 1, wherein the medical device is a dialysis machine.

4. The medical system of claim 1, wherein the assessment algorithm includes assessing brightness of areas in the image of the hand illuminated by the light source.

5. The medical system of claim 1, wherein the assessment algorithm includes comparing the image of the hand to a stored image of a clean hand and determining cleanliness of the hand based on a comparison process between the image of the hand and the stored image of the clean hand.

6. The medical system of claim 1, wherein, when the assessment result indicates that the cleanliness standard has not been met, the scanning test device causes an alert message to be displayed on a display of the scanning test device.

7. The medical system of claim 1, wherein the assessment result is transmitted over a network to a remote entity.

8. The medical system of claim 1, wherein, after multiple assessment results indicating that the cleanliness standard has not been met, the scanning test device initiates a cleanliness training and assessment protocol.

9. The medical system of claim 8, wherein the cleanliness training and assessment protocol includes sending an alert to a clinician.

10. The medical system of claim 1, wherein, after multiple assessment results indicating that the cleanliness standard has not been met, an override option is provided to allow for the medical pre-treatment protocol to continue at the medical device.

11. The medical system of claim 1, wherein information corresponding to multiple assessment results obtained over a time period are transmitted over a network to a remote entity.

12. The medical system of claim 1, wherein the scanning test device is a mobile computing device having a display.

13. The medical system of claim 12, wherein the mobile computing device is at least one of a smartphone or a tablet device.

14. The medical system of claim 12, wherein the light source is incorporated into the mobile computing device.

* * * * *